United States Patent [19]

Müller

[11] 4,303,344

[45] Dec. 1, 1981

[54] EXTRUDERS FOR THERMOPLASTICS MATERIAL

[75] Inventor: Werner Müller, Hanover, Fed. Rep. of Germany

[73] Assignee: Hermann Berstorff Maschinenbau GmbH, An der Breiten Wiese, Fed. Rep. of Germany

[21] Appl. No.: 158,280

[22] Filed: Jun. 10, 1980

[30] Foreign Application Priority Data

Jun. 15, 1979 [DE] Fed. Rep. of Germany ....... 2924318

[51] Int. Cl.³ .............................................. B29B 1/10
[52] U.S. Cl. ........................................ 366/76; 366/77; 366/83; 366/91; 366/155; 366/157; 366/192; 366/290; 366/301
[58] Field of Search ....................... 366/76, 77, 83, 86, 366/91, 97, 155, 156, 157, 186, 290, 292, 300, 301, 287, 288, 192; 425/204, 205

[56] References Cited

U.S. PATENT DOCUMENTS

| | | | |
|---|---|---|---|
| 3,183,553 | 5/1965 | Slater | 366/186 X |
| 3,310,837 | 3/1967 | Wittrock | 366/76 |
| 3,645,659 | 2/1972 | Schott, Jr. | 425/204 |
| 3,825,236 | 7/1974 | Hussmann et al. | 366/76 |
| 4,176,967 | 12/1979 | Brinkmann et al. | 366/83 |

FOREIGN PATENT DOCUMENTS

| | | | |
|---|---|---|---|
| 902513 | 8/1962 | United Kingdom | 425/204 |
| 1053728 | 1/1967 | United Kingdom | 425/205 |

*Primary Examiner*—Philip R. Coe
*Attorney, Agent, or Firm*—Schwartz, Jeffery, Schwaab, Mack, Blumenthal & Koch

[57] ABSTRACT

A two stage extruder comprising a first, vertical extruder and a second, horizontal extruder with the working chambers of the two stages connected by a connecting passage and off-set from one another so that each lies at a tangent to the other in a region which is a lower outlet region of the vertical stage and a drawing-in region of the horizontal stage; the vertical stage has a plasticizing portion with a planetary arrangement, a screw shaft supported in a lower axial pressure bearing and a butting ring for the planetary spindles disposed on the screw shaft. A lower cylindrical liner for the vertical stage has an aperture therein and the effective size of the connecting passage can be adjusted by rotating the liner.

10 Claims, 5 Drawing Figures

EXTRUDERS FOR THERMOPLASTICS MATERIAL

The invention relates to extruders and particularly to extruders for thermoplastics materials.

In the processing of thermoplastic materials it has been found advantageous in some cases to use two stage extruders. Screw type extruders in a cascade arrangement are known and enable the materials to be treated gently, because the screw shafts in each stage can be run at different speeds. Setting of the speed in one stage independently of that in another makes it possible to separate the steps in the extrusion process. For example, the steps of supplying the raw material, conveying, compressing, fusing and pre-homogenising it can be alloted to a first extruding stage. The steps of compression, temperature control, mixing, filtering and extrusion may be alloted to a second stage. The screw of the second stage, which can be cooled, is generally run at a lower rotational speed and has a larger diameter, in order to avoid harmful and unnecessary further heating of the material being processed.

It has been found that previously proposed two stage extruders are incapable of extruding a final product which is sufficiently plasticised and homogenised, with the high throughputs which are nowadays required. In particular use of moulding materials including additives which are difficult to disperse, such as colour pigments, have resulted in final products of inadequate quality.

It has been found particularly difficult to draw powdered synthetic materials into the previously proposed extruders. The deficiencies in drawing in powdered synthetic materials prevent high throughputs and also result in fluctuations in the conveying action.

The invention has among its objects to provide an extruder which will produce final products of adequate quality with a high throughput and a satisfactory drawing-in action.

According to the invention, there is provided a two stage screw extruder for thermoplastic moulding materials, comprising a first, vertical extruding stage and a second, horizontal extruding stage with working chambers of the two stages connected by a passage and off-set from one another so each lies at a tangent to the other at a lower outlet region of the vertical stage and a drawing-in region of the horizontal stage; the vertical stage has a planetary plasticising portion; a screw shaft of the vertical stage is supported in a lower axial pressure bearing; and a butting ring for the planet spindles of the planetary plasticising portion is disposed on the screw shaft at the lower end of the planetary plasticising portion.

The extruder of the invention is particularly, though not exclusively, suited to processing moulding material supplied to it in powdered form.

By feeding the moulding materials to be processed into a first extruding stage which is vertical, the gravitational force inherent in the materials is exploited. There is therefore a uniform drawing-in action, even if the moulding materials are not free running and are of low bulk density. The planetary plasticising portion in the vertical extruding stage has a plurality of helically toothed planet spindles, disposed around part of a central screw shaft. In the region of the planet spindles the central screw shaft is similarly provided with helical teeth. An internally toothed cylinder component is arranged concentrically with the vertical screw shaft. The planet spindles mesh both with the screw shaft and with the internal teeth on the cylinder component.

Planetary plasticising portions are known per se. They have the advantage that the material is repeatedly rolled out for a short time and thereby mixed very intensively. The moulding material is constantly being re-layered at short intervals. Internal shearing heat is thereby generated, which helps to fuse the moulding material.

The off-set arrangement of the two extruding stages enables the central, vertical screw shaft to be supported in the axial pressure bearing at its lower end. The axial return forces which arise are counteracted by the provision of the butting ring on the screw shaft.

Advantageously the screw shaft of the vertical stage is provided at its upper end with an elongate journal which extends into a feed hopper and/or feed stack and which is directly or indirectly connected to an agitator and/or a packing screw. This can improve the drawing-in of the moulding material supplied and the squeezing out of pockets of air from the material. The elongate journal non-rotatably connected to the screw shaft may itself carry an agitator and/or a packing screw. Alternatively the elongate journal may be used as a bearing journal for a separately driven agitator and/or packing screw.

A further improvement in the drawing-in action can be obtained by arranging for the elongate journal to be entirely or partially constructed with a conical upward taper. If the elongate journal carrying the agitator and/or packing screw is constructed with an upward conical taper, then the moulding material fed in will be supplied to the plasticising portion in an already pre-compressed state.

Preferably a packing screw, rotatable relative to the screw shaft, is disposed on the elongate journal between the feed hopper and the planetary plasticising portion and the channel volume of the packing screw decreases continuously in a downward direction. Variation in the compression ratio of the material supplied can be obtained by means of such a packing screw, which is preferably able to rotate relative to the central screw shaft. The supply of material may be set according to the particular properties of the material. Continuous reduction in channel volume results in appropriate pre-compression of the material.

Advantageously the packing screw, capable of rotation relative to the screw shaft, is driven by means of a planetary gearing coupled to the screw shaft. This is an advantageous method of driving the packing screw to cause it to rotate relative to the central screw shaft since, by means of the planetary gearing, the packing screw may be driven directly by the driven central screw shaft and an additional drive for the packing screw is not necessary. By interchanging planetary wheels the ratio of the speed of the packing screw to that of the screw shaft can be varied.

Advantageously the screw shaft of the vertical extruding stage is surrounded adjacent its lower end by a rotatable cylindrical sleeve and the sleeve has a discharge orifice therein which can be brought into registry with the passage connecting the working chambers of the two extruding stages. This provides throttling means for the extruder and enables the pressure in the vertical extruding stage to be controlled by adjusting the opening of the passage between the extruding stages.

In a further advantageous embodiment of the invention, the cylindrical sleeve which controls the operating pressure in the first stage may also be used as a starting-up valve. When the extruder is being started up the passage through the cylindrical sleeve is brought into registry with a second outlet. The moulding material being conveyed passes through the second outlet and can be fed, for example, to a waste bin. When the material emerging is sufficiently plasticised, the cylindrical sleeve is turned and the discharge orifice in the sleeve is brought into registry with the connecting passage between the two extruding stages.

Advantageously the teeth of an externally toothed main spindle portion of the planetary plasticising portion start at a level lower than the level at which teeth start on the planet spindles of the planetary plasticising portion. Thus a further improvement in the drawing-in action can be achieved by means of the recessed, externally toothed main spindle portion of the vertical screw shaft. Bridge formations in the moulding material supplied can be avoided in this way.

The invention can provide apparatus which makes it possible to process moulding materials which are difficult to process, e.g. materials in powdered or chip form, with a high throughput and satisfactory quality.

The invention is diagrammatically illustrated by way of example with reference to the accompanying drawings, in which.

Figure 1:
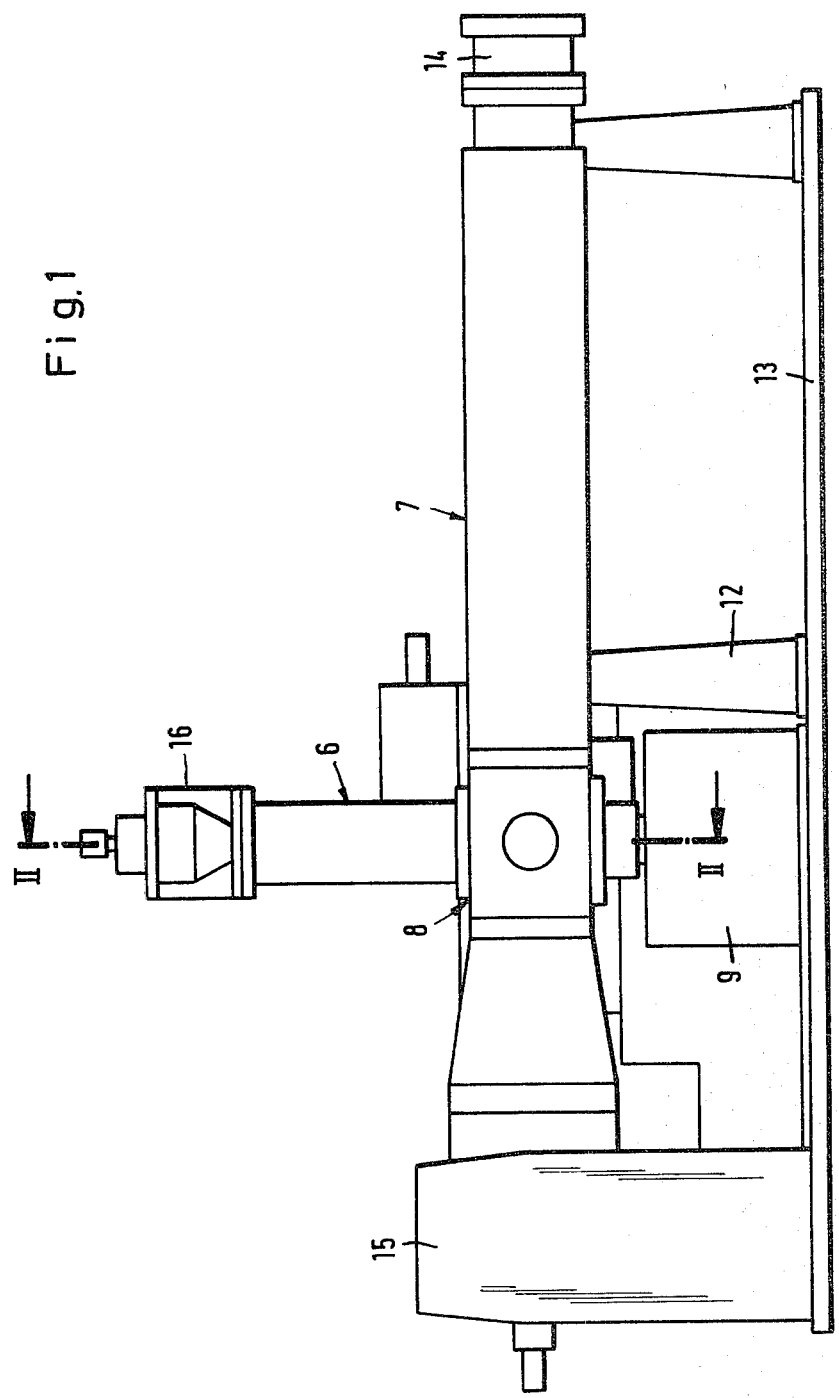
FIG. 1 is a diagrammatic representation of a two stage screw extruder according to the invention with a vertical extruding stage and a horizontal extruding stage.

Referring to the drawings a first stage of a two stage extruder is a vertically mounted stage 6. Normal to the vertical extruding stage 6 and off-set therefrom is a second, horizontal extruding stage 7. The two stages 6 and 7 lie at a tangent to one another in the region 8 of their junction.

The vertical stage 6 is mounted upright on a housing 9, in which housing 9 a motor and a mechanism for driving a rotatable screw shaft 11 of the first stage 6 are accommodated. The horizontal stage 7 is carried by a housing frame 13, by means of a centre support 12, and driven by a drive unit 15 at the end opposite to an output end 14.

Figure 2:
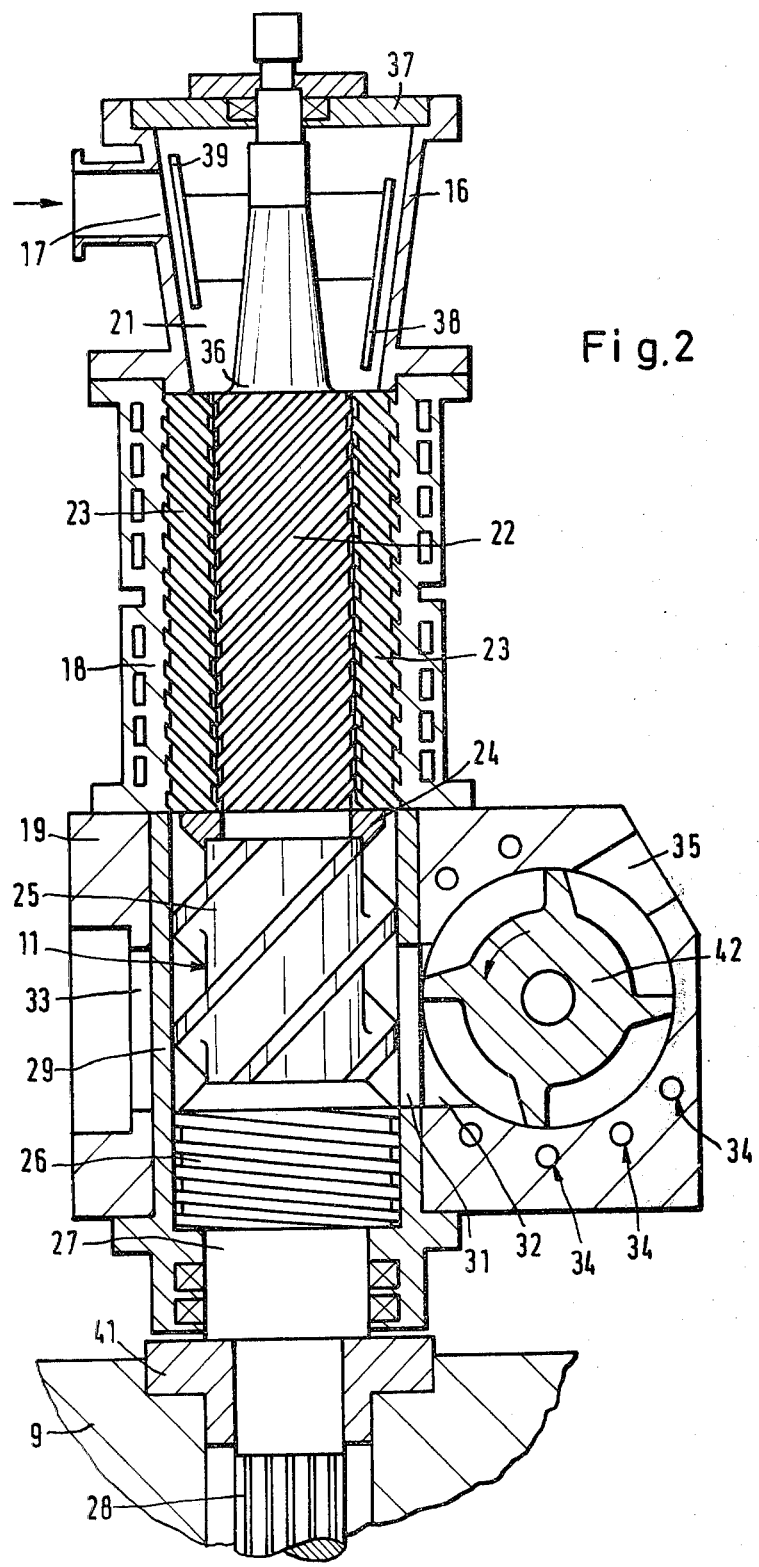
FIG. 2 is a section taken on line II—II of FIG. 1.

The vertical stage 6 has a feed hopper 16 for powdered moulding material at its upper end. The side wall of the hopper 16 contains a feed aperture 17 (FIG. 2) for supplying the material. The hopper 16 is mounted on the upper end of a cylinder 18 which in turn stands on a housing block 19 surrounding the lower part of the screw shaft 11.

The screw shaft 11 rotates in the cylinder 18 and housing block 19 of the vertical stage 6 and has a helical toothed main spindle portion 22 adjacent a filling region 21. The portion 22 is surrounded by and meshes with helical toothed planet spindles 23. The cylinder 18, extending over the length of the main spindle portion 22, has internal toothing which is engaged by the toothing on the planet spindles 23. At the bottom of the main spindle portion 22 a butting ring 24 is mounted on the screw shaft 11, and the planet spindles 23 press against it when the apparatus is running.

The butting ring 24 is adjoined by a conveying screw portion 25 which moves across the region 8 of the junction between the two stages 6 and 7. The screw portion 25 is followed by fine-pitch returning screw thread 26, adjacent a journal bearing 27, axial pressure bearing 41 and shaft drive portion 28.

The bore in the housing of the vertical stage 6 is widened in the region of the housing block 19 and has a cylindrical sleeve 29 fitted into it. The sleeve 29 has a discharge orifice 31 which, in the position shown, is in registry with a connecting passage 32 in the housing block 19. The connecting passage 32 connects the outlet region of the vertical stage 6 to the inlet region of the horizontal stage 7. Diametrically opposite the passage 32 there is a second outlet 33 in the housing block 19, which is closed by the cylindrical sleeve 29 in the position shown.

The horizontal extruding stage 7 is equipped with temperature control bores 34 and a vent 35 in the region 8 of the junction between the two stages 6 and 7.

The screw shaft 11 of the vertical stage 6 has an elongate journal 36, which projects upwardly from the main spindle portion 22 and tapers as it extends through the feed hopper 16. The free, top end of the journal 26 is mounted rotatably in a cover plate 37. The tapering journal 36 carries two stirring paddles 38 and 39 which aid in drawing in the material.

The moulding material in the form of powder or chips is placed in the feed hopper 16 through the feed aperture 17. The screw shaft 11 of the vertical stage 6 is driven. The rotating stirring paddles 38 and 39 pre-compress the moulding material, and the effect is enhanced by the reduction in the available cross-section of the feed hopper towards the bottom. The moulding material is picked up by the planetary plasticising section 18, 22, 23 and gently plasticised. When the material leaves the plasticising section 18, 22, 23, pressure is built up in it by the conveying screw portion 25, and the material is pressed through the discharge orifice 31 and connecting passage 32 into the horizontal extruding stage 7. The returning screw thread 26 prevents any particles of moulding material from entering the journal bearing 27. The moulding material is picked up by a conveying screw 42 rotating in the horizontal stage 7, gently homogenised and extruded.

Figure 3:
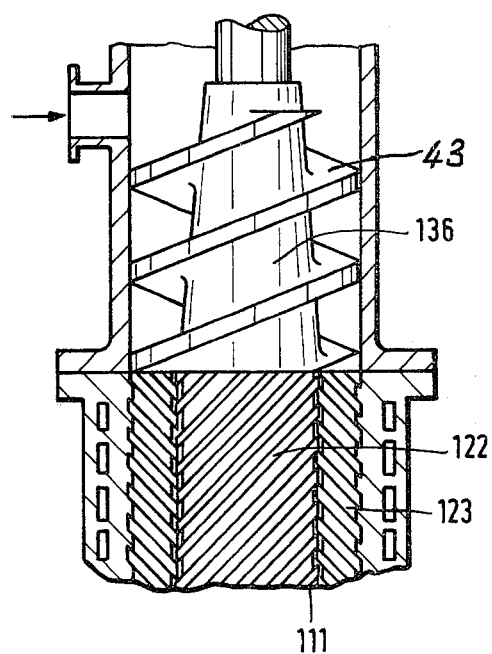
FIG. 3 shows a modified embodiment of a feed region where moulding material is pre-compressed.

FIG. 3 shows a modified embodiment of the filling region. An upwardly tapering elongate journal 136 of the screw shaft 111 is provided with a helical conveying web 43, and the feed hopper in the filling region 121 is cylindrical. The volume of the screw channel decreases constantly in a downward direction, with the advantageous result that air is pressed out of the moulding material and the material is fed to the planetary plasticising portion 122, 123 in a pre-compressed state.

Figure 4:
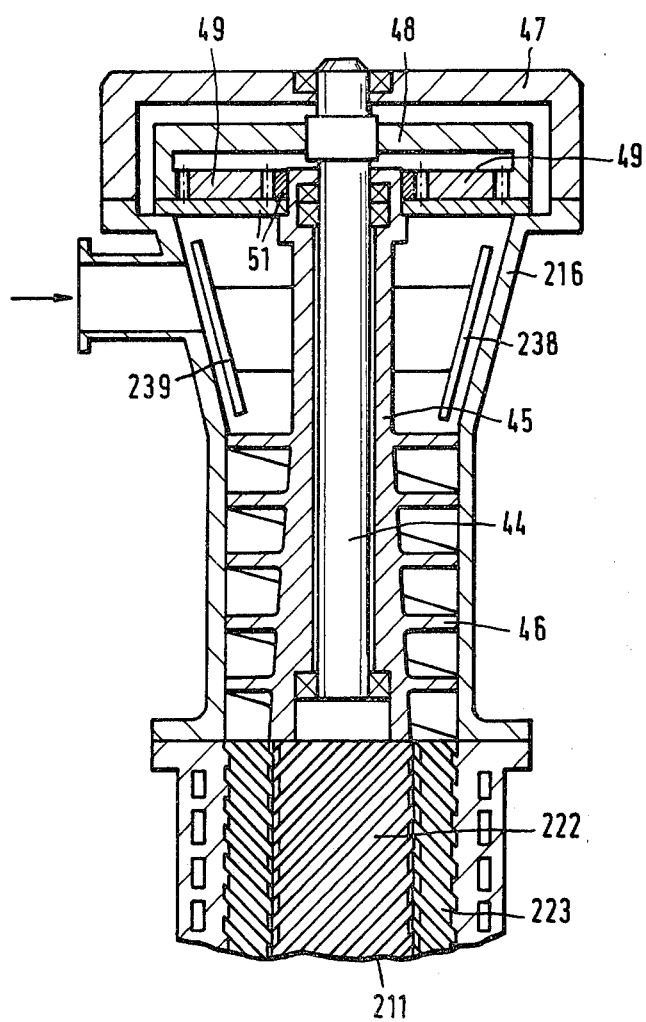
FIG. 4 shows a further embodiment of a feed region of the vertical extruding stage.

FIG. 4 shows a further modified form of the filling region on the vertical extruding stage. A main spindle portion 222 with helical teeth carries an elongate journal 44, surrounded by a sleeve 45 which is supported rotatably on it. A lower part of the sleeve 45 is constructed as a packing screw 46 with a constantly decreasing channel volume. In a conical feed hopper 216 around the top the sleeve 45, which sleeve 45 can rotate relative to a screw shaft 211, are two stirring paddles 238, 239 carried by the sleeve 45. In the course of their rotation these paddles feed the non-free-running moulding material to be drawn in by the packing screw 46 at the bottom.

The upper end of the elongate journal 44 is mounted rotatably in a housing cover 47. The upper end of the journal 44 also carries an internally toothed ring gear 48 which meshes with planet wheels 49, the planet wheels 49 in turn meshing with a pinion 51 mounted on the upper end of the sleeve 45.

The effect produced by the planet gearing 48, 49, 51 is that the rotary movement imparted to the screw shaft 211 is transmitted via the planet gearing 48, 49, 51 to the sleeve 45 and thus to the agitator 238, 239 and packing screw 46. The rotatable sleeve 45 is turned in a given ratio to the screw shaft 211 and thus to the externally toothed main spindle portion 222 of the planet-like plasticising portion 222, 223. The ratio of the number of revolutions of the packing screw 46 to those of the screw shaft 211 can be changed simply by interchanging the planet wheels 49 and slip-on pinion 51. Depending on the moulding material and the number of planet spindles 223, the volume conveyed by the packing screw 46 can thus be suited to the conveying capacity of the vertical stage 6.

Figure 5:
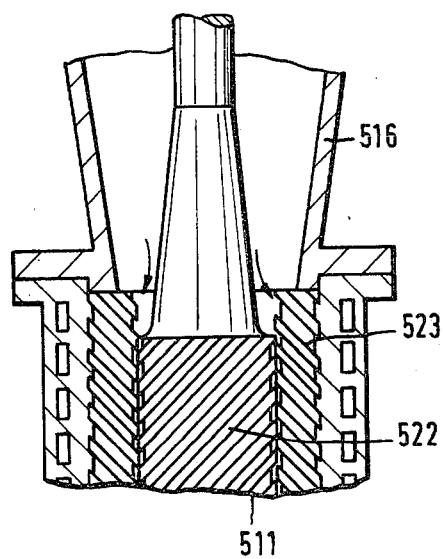
FIG. 5 shows a further embodiment of a feed region of the extruding stage, with the main spindle portion of the central screw shaft, with external teeth, set back in the planet-like plasticising portion.

FIG. 5 shows an embodiment of a planet-type plasticising portion 522, 523, where the externally toothed main spindle portion 522 of the vertical screw shaft 511 is set back at the filling side, that is to say, the planet spindles 523 project upwardly beyond the position at which the teeth start on the main spindle portion 522. The rotating and revolving planet spindles 523 thus avoid bridge formations occurring in the moulding material placed in the feed hopper 516. This results in an improved, even, drawing-in action.

What is claimed is:

1. A two stage screw extruder for thermoplastic moulding materials, said extruder comprising a first, vertical extruding stage and a second, horizontal extruding stage; a working chamber for each of said stages; a passage connecting said working chambers; said working chambers being off-set from one another so that each lies at a tangent to the other at a lower outlet region of said vertical stage and a drawing in region of said horizontal stage; a planetary plasticising portion for said vertical stage; a screw shaft for said vertical stage; a lower axial pressure bearing supporting said screw shaft; and a butting ring for planet spindles of said planetary plasticising portion disposed on said screw shaft at the lower end of said planetary plasticising portion.

2. A two stage screw extruder as claimed in claim 1, wherein said screw shaft of said vertical stage is provided at its upper end with an elongate journal, which said elongate journal extends into a feed hopper and is coupled to material feed means.

3. A two stage screw extruder as claimed in claim 2, wherein said material feed means comprises an agitator.

4. A two stage screw extruder as claimed in claim 2, wherein said material feed means comprises a packing screw.

5. A two stage screw extruder as claimed in claim 4, wherein said packing screw is rotatable relative to said screw shaft, is disposed on said elongate journal between said feed hopper and said planetary plasticising portion and the channel volume of said packing screw decreases continuously in a downward direction.

6. A two stage screw extruder as claimed in claim 5, wherein said packing screw is driven by means of a planetary gearing coupled to said screw shaft.

7. A two stage screw extruder as claimed in claim 2, wherein said elongate journal has a conical upward taper.

8. A two stage screw extruder as claimed in claim 1, wherein said screw shaft of said vertical stage is surrounded adjacent its lower end by a rotatable cylindrical sleeve and said sleeve has a discharge orifice therein which can be brought into registry with said passage connecting said working chambers of said two extruding stages.

9. A two stage screw extruder as claimed in claim 8, wherein said discharge orifice of said cylindrical sleeve can be brought into registry with a second outlet of said first extruding stage.

10. A two stage screw extruder as claimed in claim 1, wherein teeth of an externally toothed main spindle portion of said planetary plasticising portion start at a level lower than the level at which teeth start on planet spindles of said planetary plasticising portion.

* * * * *